United States Patent

Henry

[11] Patent Number: 4,964,360
[45] Date of Patent: Oct. 23, 1990

[54] AUTOMOBILE LOCATOR

[76] Inventor: James G. Henry, 9881 NW. 6th Ct., Plantation, Fla. 33324

[21] Appl. No.: 428,108

[22] Filed: Oct. 27, 1989

[51] Int. Cl.$^5$ ............................................. G09F 17/00
[52] U.S. Cl. ..................... 116/28 R; 116/173
[58] Field of Search ............ 116/28 R, 210, 173–175; 40/585, 591, 592, 601, 610; 248/188.5; 403/104, 109, 377

[56] References Cited

U.S. PATENT DOCUMENTS

| | | | |
|---|---|---|---|
| 1,121,510 | 12/1914 | Kinney | 116/173 |
| 1,302,190 | 4/1919 | McCormack | 116/173 |
| 2,417,367 | 3/1947 | Leach | 116/175 |
| 2,458,316 | 1/1949 | Swertlow | 116/173 |
| 2,490,369 | 12/1949 | Neuwirth | 248/188.5 |
| 2,503,997 | 4/1950 | BuMiller | 248/188.5 |
| 2,906,234 | 9/1959 | Scott | 116/173 |
| 3,106,184 | 10/1963 | Shea | 116/209 |
| 3,107,648 | 10/1963 | Lundstrom | 116/173 |
| 3,127,869 | 4/1964 | Howland | 116/173 |
| 3,197,628 | 7/1965 | Schuff | 116/209 |
| 4,444,399 | 4/1984 | Yanai et al. | 277/96.1 |
| 4,624,211 | 11/1986 | Jokel | 116/209 |
| 4,727,822 | 3/1988 | Wikkerink | 116/174 |
| 4,796,553 | 1/1989 | Cogswell et al. | 116/173 |

*Primary Examiner*—William A. Cuchlinski, Jr.
*Assistant Examiner*—W. Morris Worth
*Attorney, Agent, or Firm*—Malin, Haley, McHale, DiMaggio & Crosby

[57] ABSTRACT

A device to enclose a car antenna that will aid in locating the car in a large, crowded parking lot and may display a message of the user's choice. The device encloses the car antenna and provides a support for a visal attention getting device such as a flag, banner, pennant, or streamers. In addition a portion of the invention that encloses the antenna may also be colored or decorated to attract visual attention. The device may be either a single piece or a number of concentrically collapsible pieces. In addition, the device may be removed from the car antenna and used to attract visual attention or display a message in areas removed from the car.

8 Claims, 1 Drawing Sheet

AUTOMOBILE LOCATOR

BACKGROUND OF THE INVENTION

1. Field of the Invention

This invention relates to devices equally suited for locating cars in large parking lots and for dissemenating messages of the user's choice such as patriotic messages or support for a sports team. In particular this invention relates to devices for visually aiding in locating such cars or dissemenating messages.

2. Description of Related Art

In modern society, large, crowded parking lots are quite often encountered. These parking lots have no easy means of identifying where a particular car is parked; the user of the parking lot must use such cues as distance to a mall entrance or permanent landmarks to aid in finding the parked car upon return to the parking lot. The problem is particularly acute when the car to be found is one of a large number of cars in a large parking lot.

In addition, many people desire to display messages ranging from political statements to humorous statements to showings of support for a sports team. These messages are often displayed by flags, pennants, or banners attached to sticks or the like and then raised to increase the visibility of the message.

It would be useful to have a device that can either aid in finding a car in a large or crowded parking lot or display a message, either while attached to a car in the parking lot or removed and taken to a rally or to a sporting event.

SUMMARY OF THE INVENTION

The invention is a device that is conformed to the shape of and encloses an automobile antenna and presents means for attracting visual attention such as streamers, banners, flags, or pennants to aid in locating a parked car in a large or crowded parking lot, or to dissemenate a message. The invention may be removed from the antenna and taken to a political rally, sporting event, or the like.

It is therefore an object of this invention to provide an easy to use method an apparatus for distinguishing the user's parked car from the rest of the parked cars in a crowded parking lot.

It is also an object of this invention to provide a low cost means of helping the user find his or her parked car.

It is a further object of this invention to provide a means of showing patriotism and enthusiasm and support for sports or a sports team.

It is a still further object of this invention to provide a place for advertising or dissemination of a message in an area likely to have large numbers of people and in a means likely to attract attention and notice.

In accordance with these and other objects which will be apparent hereinafter, the instant invention will now be described with particular reference to the accompanying drawings.

DETAILED DESCRIPTION OF THE PREFERRED EMBODIMENTS

Figure 2:
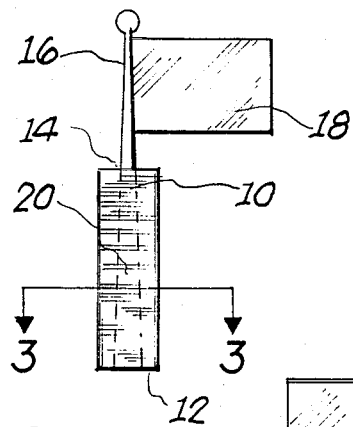
FIG. 2 is a side view of an embodiment of the invention showing the placement of the invention over, and its relationship to, the antenna shown in phantom.

In FIG. 2 shown an embodiment of this invention comprising a single, rigid, hollow casing 10 with an open end 12 and an enclosed end 14. The casing 10 is relatively longer in length than it is in diameter with such length varying from a few inches to several feet. The diameter of the casing 10 can also vary accordingly as will be best explained later in this description. Further, the casing 10 can have either gently sloping sides or parallel sides corresponding to the varying diameter of the casing 10 as detailed hereinafter.

The casing 10 is slid down a car antenna 20 by introducing the open end 12 of the casing 10 upon the upmost end of the antenna 20 and then moving the casing 10 downward until the enclosed end 14 of the casing 10 comes into physical contact with the tip of the antenna 20 or until the open end 12 of the casing 10 comes into physical contact with the car at the base of the antenna 20. From the description it is seen that the casing 10 encloses the end of the antenna 20 for a distance of a few inches to the entire length of the antenna 20, depending upon the length of the casing 10 and the length of the antenna 20.

Rigidly attached to the enclosed end 14 of the casing 10 is a flag support 16 which extends upward from the casing 10. Attached to the flag support 16, preferably at a right angle, is a flag 18. The flag 18 can be made of a rigid material and is substantially rectangularly flat, varying in size as desired. The flat sides of the flag 18 can be colored or otherwise decorated by such means as the application of decals and the like so as to attract visual attention. Such decoration can include such things as the American flag, colored striping or the like, or can be advertising or a combination of the above. The flag 18 extends away from the flag support 16 and presents the entire surface area of both sides of the flag 18 for visual observation. Although the preferred embodiment of this invention has a single flag 18 attached to the flag support 16, more than one flag 18 can be attached to the flag support 16 as is shown in FIG. 4.

Although the embodiment previously described has a substantially rectangularly flat flag, it is within the spirit of the invention that pennants or banners such as those commonly bearing sports team's names and logos, be used either in place of or in combination with the already mentioned flags 18, in all the ways, that the flags 18 appear throughout the description of the invention. These pennants may be of any shape including but not limited to rectangular, triangular, semi-circular, or oval, and decorated in any appropriate way.

Figures 3, 4:
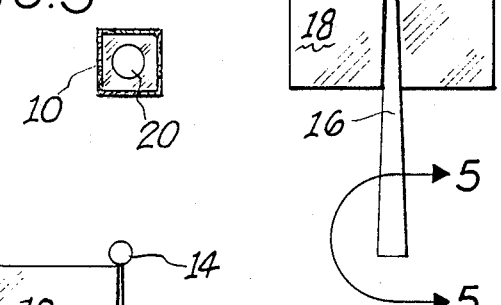
FIG. 3 is a cross-sectional view of the invention embodied in FIG. 2.
FIG. 4 illustrates an alternative embodiment of the invention.

FIG. 4 shows an embodiment of the invention having a single, rigid, hollow casing 10 with two flags 18 attached to the flag support 16.

FIG. 3 illustrates a bottom cross-sectional view of one embodiment of the casing 10 and the antenna 20. From this view it is seen that the casing 10 is substantially square in cross section and somewhat larger in circumference and enclosing antenna 20.

Figure 10:
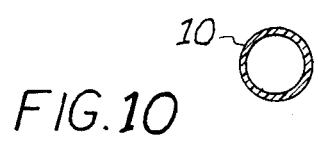
FIG. 10 shows a bottom cross sectional view of an embodiment of the invention showing a substantially circular shape to the casing of the invention.

FIG. 10 shows a cross-sectional view of another embodiment of the casing 10 showing a substantially circular cross-section.

Although square and circular cross-sections for the casing 10 have been shown, it is within the spirit of the invention to include any shaped cross-section including but not limited to triangular, rectangular, pentangular, etc., oval, star-shaped, or free-formed. Because the casing 10 must enclose the antenna 20, the diameter of the casing 10 must be slightly larger than the diameter of the antenna 20. There are a variety of antenna shapes existing from those having parallel sides to having collapsible pieces and corresponding varying diameters for the pieces, the configuration of the sides of the casing 10, and the corresponding diameters of the casing 10. They can either be parallel or gently sloping or shaped to correspond to the differing diameters of the collapsible pieces of the antenna 20.

Figure 5:
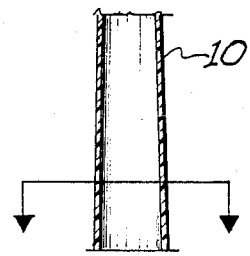
FIG. 5 is a partial cross-sectional view of the casing of the invention shown in FIG. 4.

FIG. 5 is a partial cross-sectional view of a portion of the casing taken along line 5—5 of FIG. 4, showing the substantially hollow nature of the casing 10. The invention heretofore described has included a casing 10 which is comprised of a single, hollow, rigid piece. The casing 10, flag support 16, and flag 18, can be made in one piece of a plastic type material by an injection type process such as is common in the plastic manufacturing industry. However, the individual pieces can be manufactured separately and fastened together by other processes that are well known in the industry. The casing 10 may be made of colored plastic or may have decals attached or printing embossed on the outside of the casing 10. In addition, it is possible to make all or any of the casing 10, flag support 16, and flag 18 of a metallic, wood, or paper product. Because of the simplicity in shape of these various components, their manufacture and combination will be obvious to those skilled in the art.

Figures 6, 7:
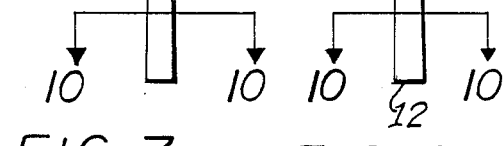
FIG. 6 is an embodiment of the invention with two collapsible casing pieces shown fully extended.
FIG. 7 is an alternative embodiment of the invention with multiple collapsible casing pieces.

FIG. 6 illustrates an embodiment of the invention whereby the casing 10, instead of being made of a single, rigid, piece is instead comprised of several casing pieces 22. The casing pieces 22 are further comprised of a relatively smaller diameter upper piece 24 and a relatively larger diameter bottom piece 28. The upper piece 24 is located toward the enclosed end 14 of the casing 10 relative to the bottom piece 28. The casing pieces 22 are slidably connected so that the smaller diameter upper piece 24 can be slidably "collapsed" into the inner circumference of the bottom piece, in a telescoping fashion.

The bottom piece 28 is comprised of a hollow tube in either square or circular cross section having a top and bottom end and slightly tapered sides. The slightly tapered sides can be either at the top end of the bottom piece 28. The direction of taper is to become narrower from bottom to top. The bottom piece 28 is slidably connected to the upper piece 24 at point 9 of FIG. 6. The upper piece 24 has a top and bottom end with either slightly tapered sides or parallel sides. A detailed view of this connection is provided in FIG. 9.

Figures 8, 9:
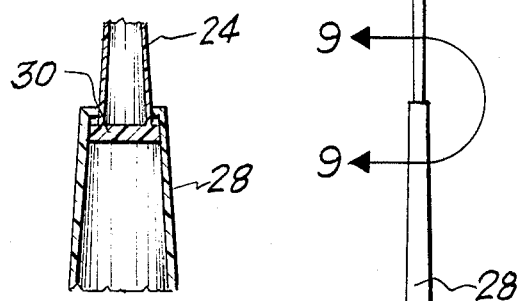
FIG. 8 shows a cross-sectional view of the uppermost connection of the collapsible casing pieces shown in FIG. 7.
FIG. 9 shows a cross-sectional view of the invention shown in FIGS. 6 and 7 with upper collapsible casing pieces of the invention.

From FIG. 9 can be see the hollow tube shape of the bottom piece 28 as it intermeshes with the hollow tube shape of the upper piece 24. The upper piece 24, being a slightly smaller outside diameter at its bottom end than the inside diameter of the top end of the bottom piece 28, is slid a small distance into the interior of the bottom piece 28. Attached to the bottom end of the upper piece 24 is an annular ring 30. The ring may be made of either metal or a semi-rigid material with a high coefficient of friction such as rubber or a rubber synthetic. The ring 30 is slightly larger in diameter than the inside diameter of the top end of the bottom piece 28 so that when the upper piece 24 is extended upward, the ring 30 prevents the upper piece 24 from separating from the bottom piece 28 by coming into physical contact with the inside of the top end of the bottom piece 28 and wedging the ring 30 against the inside diameter of the top end of the bottom piece 28. This wedging frictionally holds the upper piece 24 in place and in constant relationship with the bottom piece 28. Although the ring 30 is slightly larger in diameter than the inside diameter of the top end of the bottom piece 28, the slightly tapered sides of the bottom piece 28 provide that the diameter of the ring 30 will be less than the inside diameter of the bottom piece 28 at a distance below the top end of the bottom piece 28. The effect of the widening of the bottom piece 28 is that when the upper piece 24 is pushed downward, the upper piece 24 will descend into the body cavity of the bottom piece 28 and be encased by the bottom piece 28, thus collapsing the total height of the casing 10 for storage or transportation purposes.

FIG. 7 illustrates an alternative embodiment of this invention. This embodiment incorporates a plurality of telescoping segments, allowing for greater height.

In FIG. 8 is seen the hollow tube shape of the uppermost piece 24. The top piece 26 possesses a slightly smaller outside diameter than the inside diameter of the upper piece 24. The top piece 26 is slid a small distance into the interior of the upper piece 24 where the top piece 26 is connected to a disc 32. The disc 32 has a diameter slightly larger than the inside diameter of the top end of the upper piece 24 so that when the top piece 26 is extended upward, the disc 32 is physically wedged against the inside diameter of the upper piece 24 and frictionally held in that position relative to the upper piece 24, and provides an appropriate seal. As can be seen from the foregoing description and from reference to FIGS. 6 through 9, in the embodiment containing concentrically collapsible pieces, the upper casing piece 22, referred to as 24 in FIGS. 6 and 9 and 26 in FIGS. 7 and 8, is integral with and therefore rigidly connected to flag support 16. Thus, the upper pieces 24 and 26 respectively become the flag support 16 as they approach the flag 18.

Figure 1:
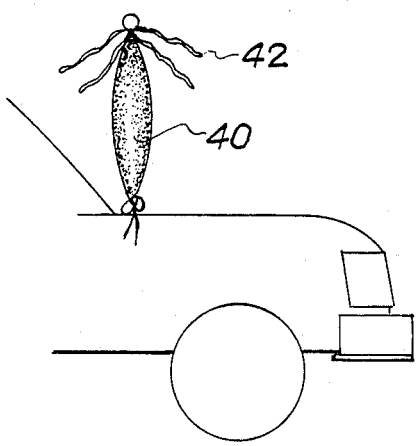
FIG. 1 is a perspective view of one embodiment of the invention shown in use on the antenna of an automobile.

FIG. 1 illustrates a further expansion of the basic embodiments heretofore described where the casing 10 is surrounded by a housing 40 attached to the casing 10 at the top and bottom of the casing 10 by such means as gluing or stapling or tying or the like. The housing 40 may be made of either fabric or plastic-type material and may hang loosely to make the housing 40 larger and thus easier to visually locate. In addition to the housing 40, FIG. 1 shows that streamers 42 may be used in place of the flag 18 to attract visual attention.

The instant invention has been shown and described herein in what it is considered to be the most practical and preferred embodiment. It is recognized, however, that departures may be made therefrom within the scope of the invention and that obvious modifications will occur to a person skilled in the art.

What is claimed is:

1. A device to aid in locating a car in a parking lot and display messages of the user's choice, comprising:
   (a) a tubular casing having an open lower end and an enclosed upper end and having sufficient size and shape to enclose a car antenna after being placed over said antenna such that said device is quickly and easily removable from said car antenna, without disassembling said device, said device being a means to visually attract attention or display a message in areas removed from said car;
   (b) means for visually attracting attention selected from the group consisting of flags, banners, pennants, and streamers; and
   (c) means for connecting said means to visually attract attention to said enclosed end of said casing comprising a rigid, substantially elongated support, having a top end, a bottom end, and a shaft, said support being rigidly connected at said bottom end to said enclosed upper end of said casing, said support protruding substantially upward from said enclosed upper end of said casing, and further comprising means to attach said means to visually attract attention to said support along said shaft of said support.

2. A device to aid in locating a car in a parking lot and display messages of the user's choice as described in claim 1 wherein said means for connecting said means to visually attract attention to said enclosed end of said casing comprises means to rigidly support said means to visually attract attention so that substantially the entire surface area of said means to visually attract attention is presented to view.

3. A device to aid in locating a car in a parking lot and display messages of the user's choice as described in claim 1 wherein means to visually attract attention are constructed of a rigid material, such that said means to visually attract attention maintain a substantially rigid, substantially flat shape.

4. A device to aid in locating a car in a parking lot and display messages of the user's choice as described in claim 1 wherein said support is attached to said enclosed end of said casing, said support extending upward from said casing in substantially the same axis as the longitudinal axis of said casing.

5. A device to aid in locating a car in a parking lot and display messages of the user's choice as described in claim 1, wherein said tubular casing further comprises:
   (a) a plurality of concentrically collapsible pieces;
   (b) means to prevent said concentrically collapsible pieces from separating when said collapsible pieces are extended.

6. The apparatus of claim 5, wherein said means to prevent said concentrically collapsible pieces from separating further comprises:
   (a) a bottom piece, having slightly tapered sides and a substantially hollow interior, and also having an upper and lower end, said upper end having slightly tapered sides, tapering in approaching said upper end;
   (b) an upper piece, having an upper and lower end, said upper piece slidably insertable into said hollow interior of said bottom piece;
   (c) a stopping device, substantially disc shaped, having a flat face attached to said lower end of said upper piece so that said flat face of said stopping device is rigidly attached to said lower end of said upper piece, and also having an outer diameter slightly larger than the inside diameter of said upper end of said bottom piece functionally disposed to come in frictional contact with the inside diameter of said upper end of said lower piece and prevent said upper piece from separating from said bottom piece.

7. A device to aid in locating a car in a parking lot and display messages of the user's choice comprising:
   (a) a tubular casing having an open lower end and an enclosed upper end and having sufficient size and shape to enclose a car antenna after being placed over said antenna such that said device is quickly and easily removable from said car antenna, without disassembling said device, said device being a means to visually attract attention or display a message in areas removed from said car, said tubular casing further comprising:
      (i) a plurality of concentrically collapsible pieces,
      (ii) means to prevent said concentrically collapsible pieces from separating when said collapsible pieces are extended;
   (b) means for visually attracting attention, wherein said means for visually attracting attention is selected from the group consisting of flags, banners, pennants, and streamers; and
   (c) means for connecting said means to visually attract attention to said tubular casing comprising a rigid, substantially elongated support, having a top end, a bottom end, and a shaft, said support being rigidly connected at said bottom end to said enclosed upper end of said casing, said support protruding substantially upward from said enclosed upper end of said casing, and further comprising means to attach said means to visually attract attention to said support along said shaft of said support.

8. A device to locate a car in a parking lot and display messages of the user's choice comprising:
   (a) a tubular casing having an open lower end and an enclosed upper end and having sufficient size and shape to enclose a car antenna after being placed over said antenna such that said device is quickly and easily removable from said car antenna, without disassembling said device, said device being a means to visually attract attention or display a message in areas removed from said car;
   (b) means to visually attract attention selected from the group consisting of flags, banners, pennants, and streamers wherein means to visually attract attention are constructed of a rigid material, such that said means to visually attract attention maintain a substantially rigid, substantially flat shape;
   (c) means for connecting said means to visually attract attention to said enclosed end of said casing comprising a rigid, substantially elongated support, having a top end, a bottom end, and a shaft, said support being rigidly connected at said bottom end to said enclosed upper end of said casing, said support protruding substantially upward from said enclosed upper end of said casing, in substantially the same axis as the longitudinal axis of said casing, and further comprising means to rigidly attach said means to visually attract attention to said support along said shaft of said support so that substantially the entire surface area of said means to visually attract attention is presented to view.

* * * * *